United States Patent [19]

Iwasaki

[11] 4,380,928
[45] Apr. 26, 1983

[54] ROTATIONAL ANGLE SENSOR

[75] Inventor: Shinichiro Iwasaki, Auburn Heights, Mich.

[73] Assignee: Aisin Seiki Company, Limited, Kariya, Japan

[21] Appl. No.: 370,188

[22] Filed: Apr. 21, 1982

Related U.S. Application Data

[63] Continuation of Ser. No. 182,703, Aug. 29, 1980, abandoned.

[51] Int. Cl.³ .............................................. G01B 7/30
[52] U.S. Cl. ..................................... 73/518; 336/110; 324/208
[58] Field of Search ............. 73/518, 517 R; 324/207, 324/208; 336/110, 132–135

[56] References Cited

U.S. PATENT DOCUMENTS

| | | |
|---|---|---|
| 3,153,935 | 10/1964 | Karlson . |
| 3,168,830 | 2/1965 | Chass . |
| 3,480,854 | 11/1969 | Jaquith et al. . |
| 3,855,528 | 12/1974 | Brown . |
| 3,877,314 | 4/1975 | Bernin .............................. 73/517 B |
| 4,013,911 | 3/1977 | Fujiwari et al. . |
| 4,140,970 | 2/1979 | Blincoe .............................. 324/208 |
| 4,258,279 | 3/1981 | Hovarka . |
| 4,284,916 | 8/1981 | Onodera et al. . |
| 4,286,279 | 8/1981 | Honsinger . |

FOREIGN PATENT DOCUMENTS 909023 10/1962 United Kingdom ................. 324/207
445834 10/1974 U.S.S.R. .

OTHER PUBLICATIONS

"Force and Displacement Transducers" by Mohri et al., from "Electrical Engineering in Japan", vol. 99, No. 2, pp. 105–112.

Primary Examiner—James J. Gill
Attorney, Agent, or Firm—Oblon, Fisher, Spivak, McClelland & Maier

[57] ABSTRACT

A rotational angle sensor device includes a casing, a movable body rotatably supported on the casing, a permanent magnet secured to the movable body, a magnetically soft member adjacent to the permanent magnet, and an electrical coil wound on the magnetically soft member. The movable body is responsive to a rotational angle or angular displacement caused by an external object, in response to which the permanent magnet moves in relation to the magnetically soft member, causing variations in the external flux. Those variations in external flux cause corresponding variations in the time interval from the instant at which a voltage is applied to the electrical coil to the instant at which the coil current reaches a certain level. The variations in the time interval are detected to determine the rotational angle caused by the external object. The magnetically soft member is preferably formed from an amorphous magnetically soft material. Various embodiments of the rotational angle sensor device are disclosed.

11 Claims, 22 Drawing Figures

ROTATIONAL ANGLE SENSOR

This is a continuation, of application Ser. No. 182,703, filed Aug. 29, 1980, now abandoned.

BACKGROUND OF THE INVENTION

1. Field of the Invention

The present invention relates in general to a novel rotational angle sensor which provides corresponding electrical signals in response to rotational angles detected by the sensor.

2. Description of the Prior Art

One prior art sensor of the type disclosed herein includes a movable body capabe of angular displacement on a rotary axis and a potentiometer having a slider linked to the movable body. In this sensor, the potentiometer provides an analog voltage output according to the amount of the angular displacement of the movable body. In this type of sensor, it is desirable that the potentiometer have a thin-film resistor which has a high wear resistance. It is also desirable for the potentiometer to provide a stable output voltage level in response to the positions to be assumed by the slider. It is further desirable that the linkage connecting the movable body with the slider should be operated with reliable stability without causing loose connections. Furthermore, the contact between the slider and the thin-film resistor should desirably take place with sufficient stability to permit the two contacting parts to resist any vibrations and shocks.

In the prior art sensor, however, the contact between the slider and thin-film resistor in the potentiometer is implemented by pressure, so that as any one or both of the two contacting elements wear with time or when vibrations or shocks occur, the potentiometer eventually provides incorrect or improper output voltages in response to the angular displacement of the movable body.

SUMMARY OF THE INVENTION

In light of the problems of the prior art, it is one object of the present invention to provide an improved rotational angle sensor which includes a contact-less converter means thereby eliminating the need for a mechanical contact means in the mechanical-electrical transducer system for converting mechanical variation to corresponding electrical signals.

Another object of the present invention is to provide an improved rotational angle sensor which is constructed with high rigidity thereby making it resistant to vibrations and shocks.

Still another object of the present invention is to provide an improved rotaional angle sensor which permits a relatively simple electrical processing of the electrical rotational angle detect signals produced by the sensor.

A further object of the present invention is to provide an improved rotational angle sensor which incorporates a large scale integrated (LSI) circuit of the type utilized in microcomputers which contains relatively simple programmed logic circuits which can interpret and process the detected rotational angle data.

In accordance with the present invention briefly summarized above, the rotational angle sensor comprises a casing, a movable body rotatably supported by the casing, at least one stationary magnetically soft member disposed in the casing and carrying an electrical coil thereon, and a permanent magnet disposed adjacent to the magnetically soft member and secured to the movable body. In one preferred embodiment of the present invention, the magnetically soft member and the permanent magnet are arranged such that any angular displacement of the movable body causes the two members to be rotated relative to each other with the axes of the magnetically soft member and the permanent magnet intersecting the rotary axis of the movable body. In other preferred embodiments, the magnetically soft member and the permanent magnet are arranged eccentrically with respect to the movable body such that any angular displacement of the movable body causes the two members to be moved closer to or away from each other. The magnetically soft member has a small transverse cross-section which enables it to reach its magnetic saturation readily. The electrical coil has a large number of turns which is sufficient to cause the magnetically soft member to be magnetically saturated when a relatively low voltage is applied to the coil thereby causing a low level energizing current to flow through the coil. The dimensions of the permanent magnet are reduced such that it can supply a magnetic field of a sufficient strength to the magnetically soft member depending on the amount of the displacement of the permanent magnet within its predetermined range of movement.

A time interval T, from the instant at which a voltage begins to be applied to the coil wound on the magnetically soft member, to the instant at which the magnetically soft member reaches its magnetic saturation, can be expressed in the following approximate equation:

$$T = \frac{N}{E} \times (\phi_m - \phi_x) \quad (1)$$

where:
E: applied voltage across coil
N: Number of turns of coil
$\phi_m$: maximum flux ($\neq$saturated flux)
$\phi_x$: external magnetic field flux As can readily be understood from the above equation, moving the permanent magnet causes $\phi_x$ to change, thus changing the time interval T. In more detail, moving the permanent magnet according to the angular displacement of the movable body causes corresponding variations in the external magnetic flux $\phi_x$ to be applied to the magnetically soft member, thus causing corresponding changes in the time interval T from the instant at which a voltage is to be applied to the coil, to the instant at which the coil energizing current reaches a given level. Based on the above observation, the rotation angle sensor according to the present invention includes an electrical circuit or electronic semiconductor device which detects the time interval T and which provides an electrical signal output representing a voltage level or digital code corresponding to the detected time interval T.

In the preferred embodiments of the present invention, an amorphous magnetic material is preferably employed to form the magnetically soft member. Usually, since the amorphous magnetic material member must be manufactured by quenching from a liquid-phase metal, it is formed in thin sheets. Magnetically, it is ferromagnetic and has the properties of high permeability ($\mu_{max} > 10^3$) and high magnetic saturation. Additionally it provides a small coercive force ($< 1.0 \, O_E$), and is mechanicaly strong and hard to break. Other features are its resilience and reproducibility. Those features or properties of the amorphous magnetic material meet the mechanical and electrical requirements of the rotation angle sensor according to the present invention. Therefore, using such material makes it easy to electrically process signals and provides improved accuracy, in determining the value of the time interval T. It also permits a relatively simple manufacturing process and makes the magnetically soft member more resistant to vibrations and shock. Such magnetically soft materials are described in Hasegawa et al., "Soft Magnetic Properties of Metallic Glasses—Recent Developments", J. Appl. Phys. 50(3), March, 1979, PP. 1551—1556. Magnetically soft materials are sold under the trademark METGLAS (TM) by Allied Chemical Corp.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1b is a sectional view taken along the line Ib—Ib shown in FIG. 1a;

FIG. 2b is a signal waveform diagram showing the input and output signals of the electrical signal processing circuit shown in FIG. 2a;

FIG. 3b is a signal waveform diagram showing the input and output signals of the circuit shown in FIG. 3a;

FIG. 4 is a block diagram of a counter circuit arrangement which provides a digital code signal representing a time difference td between an input pulse and an output pulse of the electrical processing circuit shown in FIG. 3a;

FIG. 6b is a graphical representation of data obtained, by measuring a voltage Vθ as a function of the rotational angle, using the arrangement shown in FIG. 6a coupled to the electrical processing circuit shown in FIG. 2a;

FIG. 6c is a graphical representation of data obtained, by measuring a time delay td between waveforms of input and output pulses as a function of rotational angle, using the arrangement shown in FIG. 6a coupled to the electrical processing circuit shown in FIG. 3a;

FIG. 7b is a cross-sectional view taken along the line VIIb—VIIb in FIG. 7a;

FIG. 9b is a graphical representation of data obtained by measuring a voltage Vθ as a function of rotational angle using the arrangement shown in FIG. 9a coupled with the electrical processing circuit shown in FIG. 8a;

FIG. 10b is a cross-sectional view taken along the line Xb—Xb in FIG. 10a.

DESCRIPTION OF THE PREFERRED EMBODIMENTS

Figure 1A:
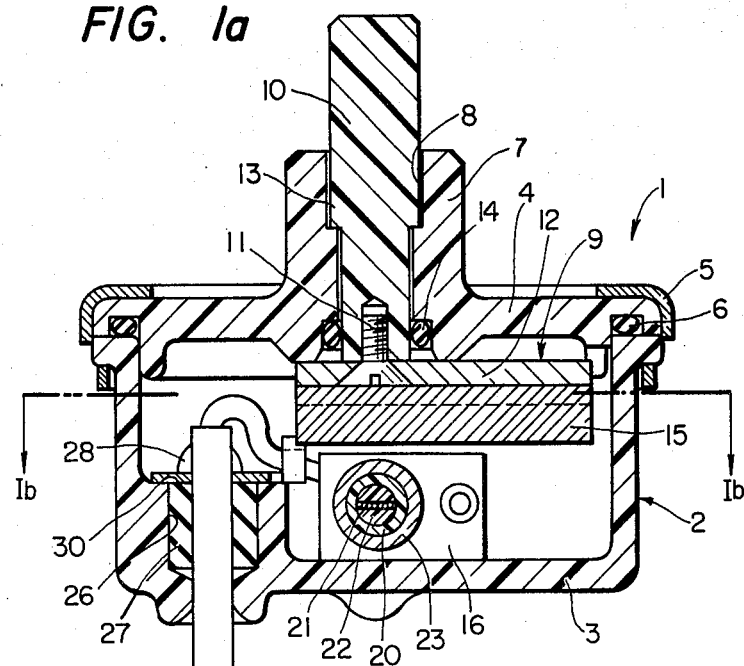
FIG. 1a is a longitudinal sectional view of a rotational angle sensor according to one preferred embodiment of the present invention.
Figure 1B:
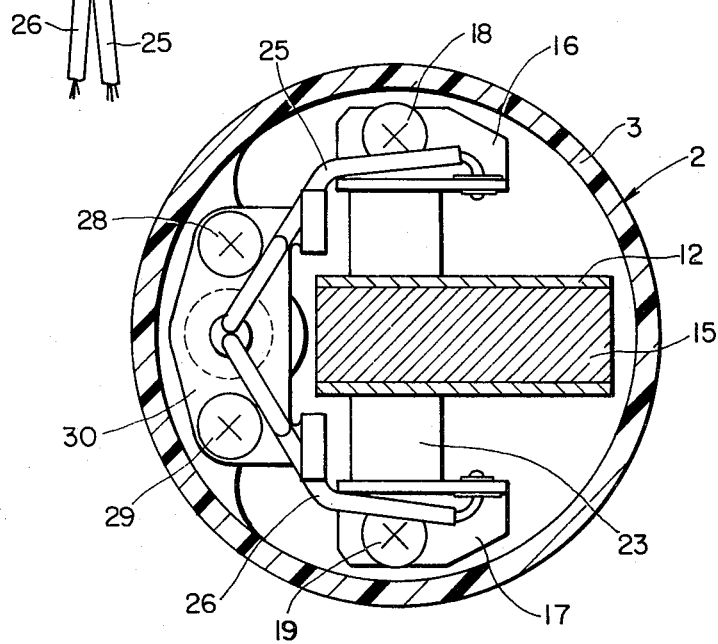

Referring now to the drawings, wherein like reference numerals designate identical or corresponding parts throughout the several views, and more particularly to FIGS. 1a and 1b thereof, a first preferred embodiment of the present invention is shown. A rotational angle sensor arrangement generally designated by 1 has a casing 2 including a cup-shaped member 3 and a cover member 4, both made from nonmagnetic material such as synthetic resin substances, and joined together by any suitable fastening means. The cup-shaped member 3 and cover member 4 are joined with a sealing ring 6 interposed between the joints of the two members to prevent water, dust, or other foreign matter from entering the interior of the casing 2 through the joints. The cover member 4 has a central boss 7 extending externally therefrom including a central stepped aperture 8 extending longitudinally therein. The central boss 7 accommodates an input shaft member 10 of a movable body 9 in the central aperture 8, and supports an inner end of the input shaft member 10. The movable body 9 incorporates the input shaft member 10 and a member 12 for retaining a permanent magnet. The permanent magnet retaining member 12 is secured to the inner end of the shaft member 10 by means of a screw 11. The input shaft member 10 and the permanent magnet retaining member 12 are both made of nonmagnetic material. The input shaft member 10 has an outer peripheral stepped portion 13 which abutts against the internal stepped portion of the boss 7. Thus, axial inward movements of the movable body 9 within the casing 2 with respect to the cover member 4 are prevented due to the stepped portions abutting against each other. Axial outward movement of the movable body 9 is prevented by the retaining member 12. The input shaft member 10 has an annular sealing ring 14 mounted about the outer periphery thereof; the sealing ring 14 preventing entry of water or dust into the casing 2. The permanent magnet retaining member 12 in the movable assembly 9 serves to hold the permanent magnet 15 firmly.

A pair of terminal plates 16, 17, both made of electrically conductive, nonmagnetic materials, are firmly attached to the inner wall of the cup-shaped member 3 by means of respective screws 18, 19. The terminal plates firmly support a nonmagnetic material bobbin 20 disposed therebetween. The bobbin 20 has a central bore for accommodating a magnetically soft elongated member 21 immovably therein, and has an insulator 22 which electrically insulates the bobbin assembly from the terminal plates 16, 17. An electrical coil 23 is wound around the bobbin 20; the opposite ends of the coil 23 being electrically connected with the respective terminal plates 16 and 17. Lead wires 25, 26 from the terminal plates pass through a sealing plug 27 embedded in a hole 26 in the cup-shaped member 3 and extend outwardly through a hole in the casing 2 such that the interior of the casing is kept waterproof. A retaining member 30, which is firmly attached to the inner wall of the cup-shaped member 3 by means of screws 28, 29, holds the sealing plug 27 immovably and also holds the leads 25, 26 in a fixed position.

As shown in detail in FIGS. 1a and 1b, the permanent magnet 15 is arranged such that a straight line connecting its opposite poles intersects the rotary axis of the movable assembly 9, and the magnetically soft member 21 carrying the coil 23 thereon is arranged such that an axis through the winding 23 intersects the rotary axis of the movable assembly 9. As such, when an angular displacement occurring in an object to be detected (not shown) is imparted to the input shaft member 10 of the movable assembly 9, the movable assembly 9 has a corresponding angular displacement, causing the permanent magnet 15 to be moved to a degree corresponding to the angular displacement with regard to the magnetically soft member 21. A new angular position, now assumed by the permanent magnet 15 as a result of its angular displacement, is then detected by an electric processing circuit or by an electronic logic processor unit, and is processed as described below.

Figure 2A:
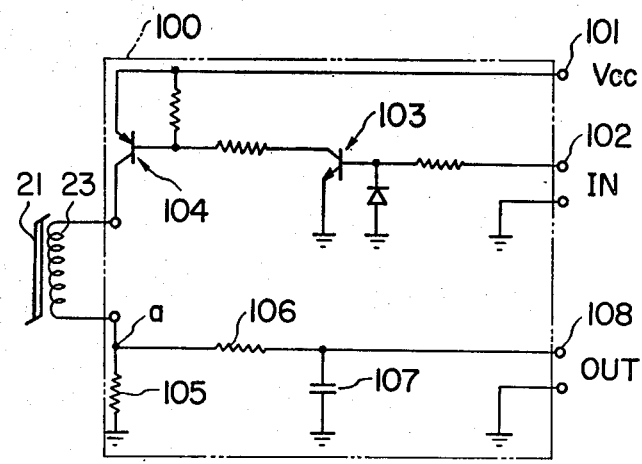
FIG. 2a is a circuit diagram of an electrical signal processing circuit arrangement connected to the rotational angle sensor shown in FIGS. 1a and 1b which provides an analog voltage output whose level corresponds to the detected angular dislacement.

FIG. 2a is a schematic diagram illustrating the arrangement of an electrical processing circuit 100 according to a first embodiment. The circuit arrangement 100 includes a terminal 101, coupled with a constant power supply source (not shown), to which a constant level d.c. voltage (+5 V, for example) from the source is applied. An input terminal 102 is provided. As such, applying a voltage pulse of between 5 to 25 KHz to the input terminal 102 causes an NPN transistor 103 to conduct during the positive level of the voltage pulse while causing the NPN transistor 103 to turn off during the ground level of the pulse. A PNP transistor 104 is provided, which remains on during the time period that the NPN transistor 103 is on, and which remains off during the time period that the NPN transistor 103 is off. Thus, the supply voltage (Vcc) is applied to one terminal of the coil 23 during the positive level of the input voltage pulses and no supply voltage is applied to the coil during the ground level of the input voltage pulses. A voltage proportional to the current flow through the coil 23 is developed across a resistor 105, and is applied to an integrator circuit consisting of a resistor 106 and a capacitor 107. The integrator circuit provides an integrated voltage output which appears at an output terminal 108.

Figure 2B:
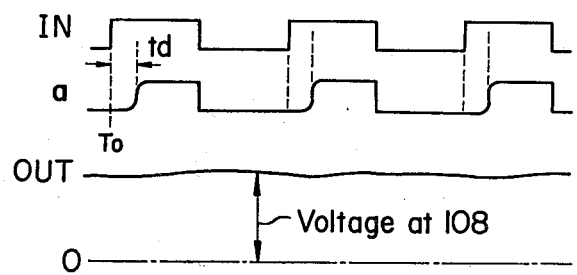

FIG. 2b shows the waveforms of the input and output voltages of the circuit shown in FIG. 2a. A time period td from the instant that the input voltage (IN) rises at the beginning of the positive level to the instant at which the voltage across the resistor 105 rises to over a given level, and the integrated voltage Vx from the voltage (a) across the resistor 105 corresponds to the angular displacement of the permanent magnet 15.

Figure 3A:
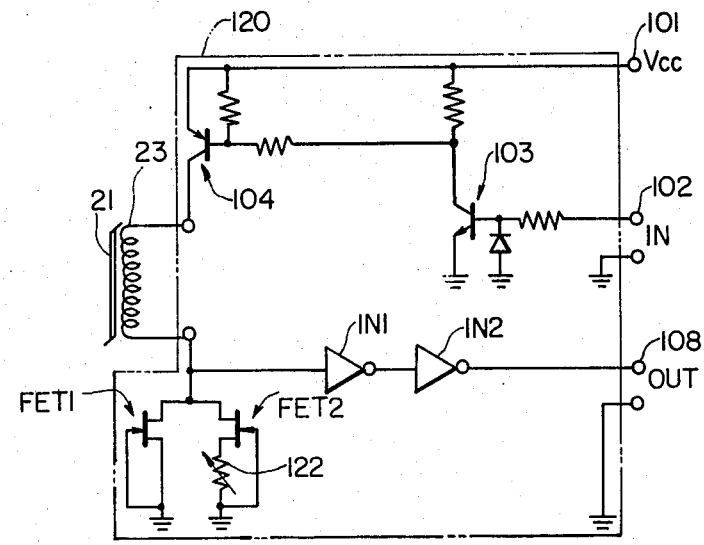
FIG. 3a is a circuit diagram of an electrical circuit connected to the rotational angle sensor shown in FIGS. 1a and 1b which provides output pulses at a timing delay with respect to the corresponding input pulses representing the angular displacement.

FIG. 3a is a schematic diagram illustrating an arrangement of the electrical processing circuit according to another embodiment. In this embodiment, NPN transistor 103 is turned off during the ground level of the input voltage (IN), causing PNP transistor 104 to turn off. Therefore, no voltage is applied to the coil 23. On the other hand, the transistors 103 is turned on during the positive level of the input voltage (IN), causing the PNP transistor 104 to turn on. The coil current flows into a pair of junction N-channel field effect transistors FET 1 and FET 2 which provide a constant level current. The level of current flow through FET 2 is determined by a variable resistor 122. A voltage appearing at the coil terminal coupled with FET 1 and FET 2 is connected to a pair of cascade connected inverting amplifiers IN1 and IN2 which provide an amplified and shaped voltage waveform.

Figure 3B:
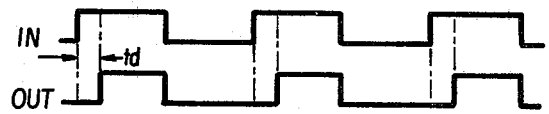

FIG. 3b shows the input and output voltage waveforms of the circuit shown in FIG. 3a. As clearly shown in FIG. 3b, the output waveform (OUT) of the circuit 120 is a voltage pulse which is delayed a time interval td with respect to the input pulse (IN), and the time interval td corresponds to the angular position assumed by the magnet 15. The time interval or delay td is processed by a counter circuit 140 shown in FIG. 4 which provides a digital code signal representing the input time interval information. In the counter circuit 140, the rising edge of the input voltage pulse (IN) sets a flip flop circuit F1 whose Q output assumes a high leve "1", enabling an AND gate A1 to be triggered on thus allowing a pulse provided by a clock pulse generator 141 to be applied to a count pulse input CK of a counter 142. An output pulse (OUT) and the Q output of the flip flop F1 are applied to an AND gate A2. The AND gate A2 is triggered to a high level state "1" at the rising edge of the output pulse (OUT), and the flip flop F1 is reset at the rising edge of the gate output, causing the Q output to assume a low level state "0". Thus, the AND gate A1 is disabled, and a clock pulse is no longer fed to the counter 142. When the output of the AND gate A2 changes to a "1" state, a count code output of the counter 142 is stored in a latch circuit 143. Resetting flip flop F1 and storing the count code output in the latch circuit 143 causes the AND gate A3 to provide a clock pulse output which clears the counter 142. The code output of the latch circuit 143 represents the number of occurances of the clock pulse during the time interval td, and accordingly represents the time interval td.

Figure 5:
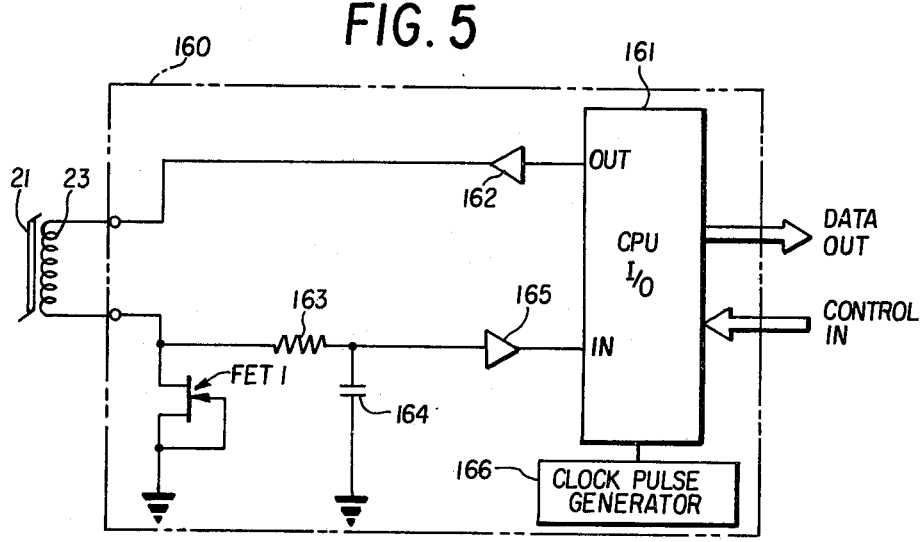
FIG. 5 is a block diagram of an electronic processor unit connected to the rotational angle sensor shown in FIGS. 7a and 7b including a single chip microcomputer which computes a time delay at which a coil current pulse begins to rise with respect to a pulse voltage applied to the electrical coil in the sensor.

An electronic logic processor unit 160 illustrated in FIG. 5 includes a single chip microcomputer (a large scale integration (LSI) semiconductor device) 161, an amplifier 162, a junction N-channel field effect transistor FET 1 which acts as a constant current source, a resistor 163, a capacitor 164, an amplifier 165, and a clock pulse generator 166. The resistor 163 and the capacitor 164 form a filter circuit which rejects voltage frequencies above the input and output pulse frequencies. The microcomputer 161 is operated based on the clock pulses and provides constant frequency pulses in the frequency range between 5 KHz and 30 KHz, which are fed to the amplifier circuit 162. The microcomputer 161 also monitors a voltage (the output voltage of the amplifier 165) appearing at a junction between the N-channel FET 1 and one end of the coil 23, and counts the number of clock pulses appearing during a time interval td from the rising edge of the computer's output pulse to the rising edge of the output voltage pulse of the amplifier 165 thus providing a count code output (DATA OUT) which represents the time interval data td.

As noted above, the rotational angle sensor 1 shown in FIGS. 1a and 1b is connected to the various forms of the electrical processing circuits and the electronic logic processor circuit arrangements so as to provide an electrical signal which represents an angular position to be assumed by the permanent magnet 15 in the sensor arrangement 1.

Figure 6A:
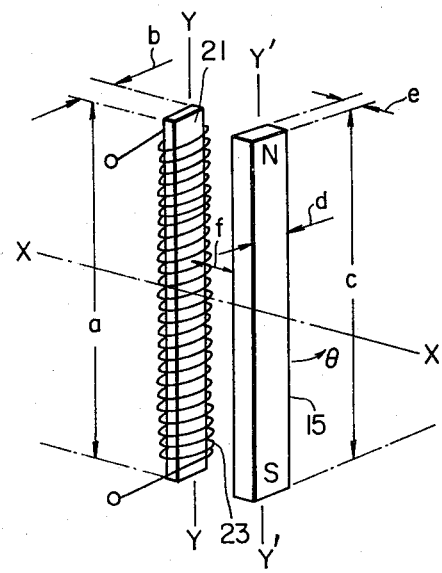
FIG. 6a is a perspective view illustrating the relative positions that the permanent magnet 15 assumes with respect to the magnetically soft member 21 shown in FIGS. 1a and 1b.

Next, the operation of the rotational angle sensor 1 combined with any one of the electrical processing circuits 100, 120, 140, and the electronic logic processor circuit, to provide corresponding electrical signals representing the angular position information will be described. Initially, the angular position assumed by the movable body 9 in the rotational angle sensor is translated into an angular position to be assumed by the permanent magnet 15. Then, the angular position assumed by the magnet 15 is converted to a corresponding electrical signal. The conversion operation will now be described using the experiental data presented in FIGS. 6b and 6c. In obtaining such experimental results, the inventor of the present invention has provided a stationary magnetically soft member 21 and a permanent magnet 15 in parallel with the member 21, as shown in FIG. 6a. An axis traversing the center of the magnetically soft member 21 and the permanent magnet 15 perpendicular to the longitudinal plane thereof is taken as a line X—X. The longitudinal axis Y'—Y' of the permanent magnet 15 and the longitidunal axis Y—Y of the magnetically soft member 21 intersect the X—X line as shown. The polarities of the permanent magnet 15 and coil current 23 are the same for the configuration shown in FIG. 6a. Under the above test conditions, the values of Vθ and td have been determined as a functin of a rotational angle θ of the permanent magnet 15 turning about the X—X line. Cases No. 1 and No. 2 in the following table 1 presents the relationships between the parameters such as shape, configuration, dimensions a through f, and the type of material of the magnetically soft member, and the experimentally obtained results.

TABLE 1

Figure 6B:
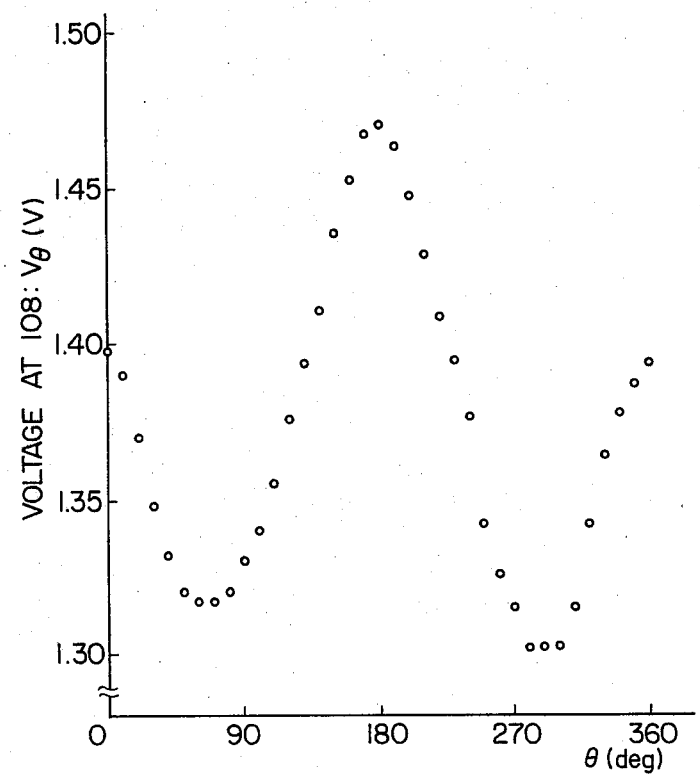
Figure 6C:
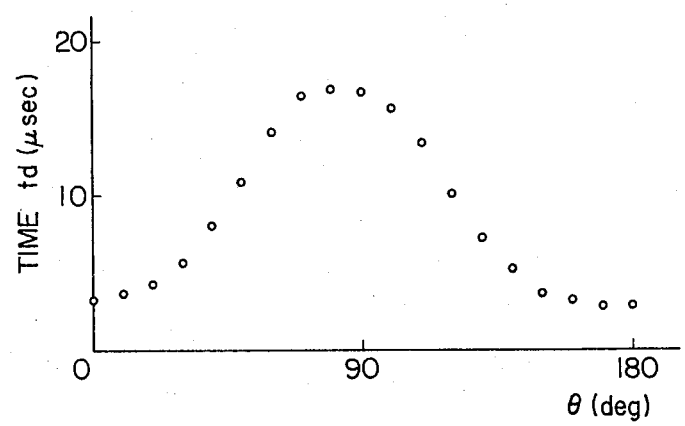

| Case No. | Material, Atomic weight Percent | Magnetically Soft Member Thickness mm | a mm | b mm | Number of sheets | Coil 23 Number of turns | Permanent magnet 15 c mm | d mm | e mm | Spacing f mm | Measuring means and frequency of input pulse | Applied Voltage mode | Data |
|---|---|---|---|---|---|---|---|---|---|---|---|---|---|
| 1 | Fe Ni Mo B 40 140 14 6 Amorphous | 0.058 | 30 | 1.8 | 5 | 1000 | 30 | 5 | 4 | 5 | Circuit 100 5 KHz | N-N S-N | FIG. 6b |
| 2 | Fe Ni Mo B 40 140 14 6 Amorphous | 0.058 | 30 | 1.8 | 5 | 800 | 4 | 5 | 4 | 5 | Circuit 120 5 KHz | N-N S-N | FIG. 6c |

In the above table, the applied voltage mode N—N indicates that in FIG. 6a a coil 23 is connected with the electrical circuit 100 or 120 such that the upper end of the magnetically soft member provides an N polarity. Similarly, S-N indicates that the coil 23 is connected with the electrical circuit 100 or 120 so that the upper end of the magnetically soft member provides an S polarity. In this embodiment in FIG. 6a, the mode N—N is provided at rotation angle θ of 0° through 90° and 270° through 360°, and S-N is provided at rotation angles θ of 90° through 270°.

In Case No. 1, it is seen from the data in FIG. 6b that a voltage Vθ obtained is highly proportional to the angular position θ of the permanent magnet 15 in thr ranges of the rotation angle θ of 100° through 170° and 190° through 260°. It is also seen from the data regarding Case No. 2 that a delay time td obtained is very accurately proportional in the ranges of the rotation angles θ of 30° through 70° and 100° through 140°. In the rotational angle sensor 1 shown in FIGS. 1a and 1b, the operating range of the permanent magnet 15 is determined such that it can operate in the above ranges in which the voltage Vθ or delay time td has the respective values varying accurately in proportion to the detected rotation angle θ.

Figure 7A:
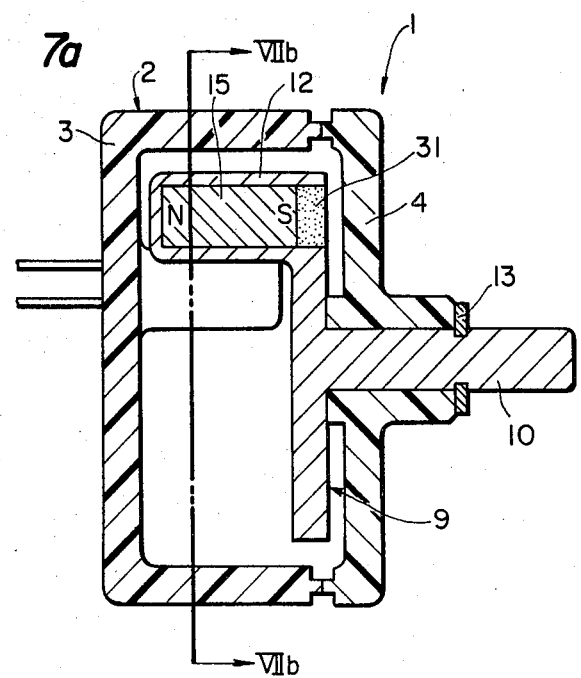
FIG. 7a is a longitudinal sectional view of a rotational angle sensor according to another preferred embodiment of the present invention.
Figure 7B:
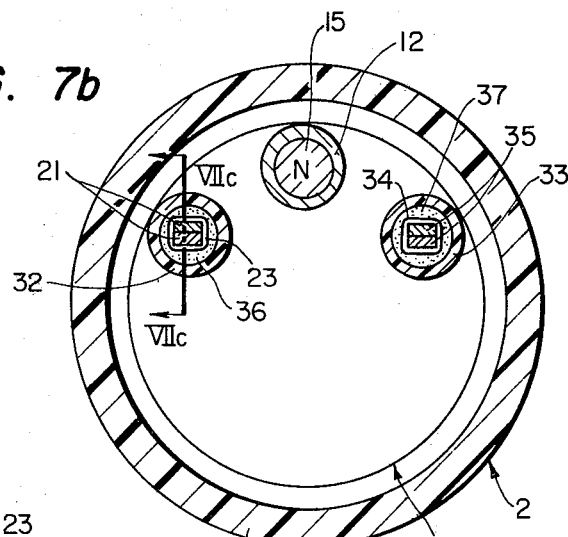
Figure 7C:
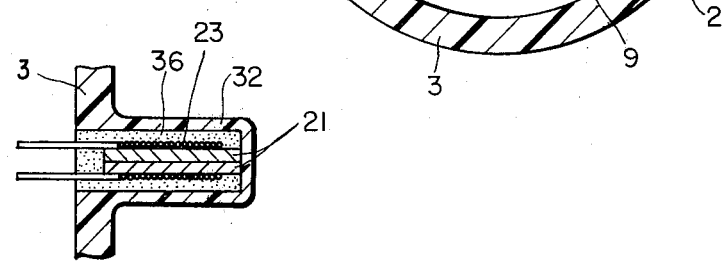
FIG. 7c is a cross-sectional view taken along the line VIIc—VIIc in FIG. 7b.

In another preferred embodiment of the rotational angle sensor 1 shown in FIGS. 7a to 7c, a casing 2 is formed by a cup-shaped member 3 and a cover member 4 both made of synthetic resin material combined by the ultrasonic wave fusing method. A movable assembly 9 includes an input shaft member 10 rotatably supported by the cover member 4 and a cylindrical housing 12 disposed within the casing 2 for accommodating a permanent magnet. A stop ring 13 is mounted on the input shaft member 10 for limiting the axial movement of the movable assembly 9 with respect to the cover member 4. The cylindrical housing 12 is positioned so that it deviates from the rotary center point of the movable body 9. The housing 12 has an opening for inserting a permanent magnet 15 which is plugged with any suitable filler material 31 after the magnet 15 is placed in position in the housing 12. The permanent magnet 15 is disposed such that a direct line linking the opposite poles of the magnet 15 is parallel with the rotary axis of the movable body 9. The cup-shaped member 3 has a pair of cylindrical housings 32, 33 for accommodating a respective pair of magnetically soft members which project into the casing 2. The cylindrical housings 32, 33 are spaced away from the rotary center point of the movable body 9 by a distance equal to the deviation of the housing 12 from the rotary center point, and are spaced away from each other in the direction of rotation of the movable body 9. As mentioned above, the cylindrical housings 32 and 33 accommodate a pair of magnetically soft members 21 and 35 carrying the respective coils 23 and 34 thereabout, and are plugged with fillers 36 and 37 which serve to place the members 21 and 35 in immovable positions. One magnetically soft member 21 is disposed in its housing such that an axis through the coil 23 is in parallel with the rotary axis of the movable body 9. In this embodiment of the sensor 1, moving the movable body 9 to a given angular position causes the permanent magnet 15 to rotate between the pair of magnetically soft members 21 such that the magnet 15 moves closer to one magnetically soft member while moving further away from the other magnetically soft member. The movement of the permanent magnet 15 with respect to the pair of magnetically soft members is detected by one of the electrical processing circuits 180, 200 shown in FIGS. 8a and 8b and the electronic logic processor unit 220 shown in FIG. 8c.

Figure 8A:
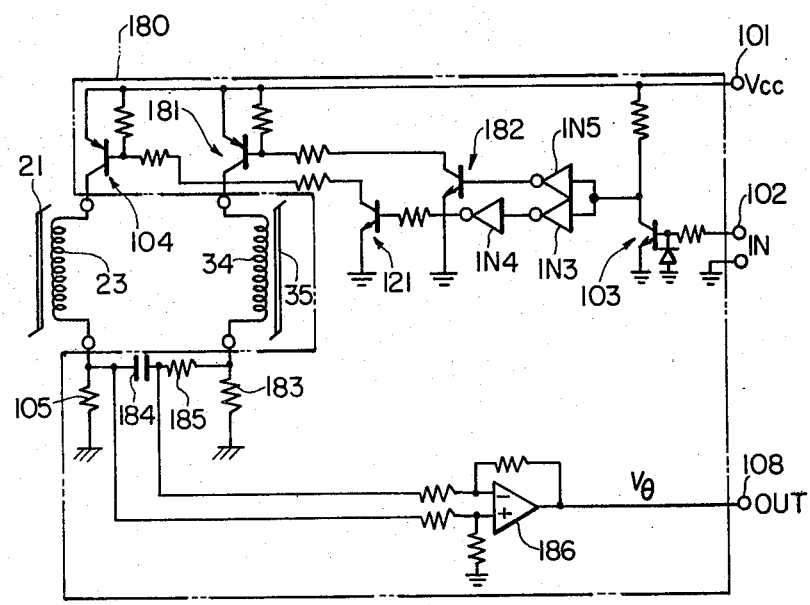
FIG. 8a is a circuit diagram of an electrical processing circuit connected to the rotational angle sensor shown in FIGS. 7a and 7c, which provides an analog voltage output whose level corresponds to the detected angular displacement.

The electrical processing circuit 180 shown in FIG. 8a provides an analog voltage $V\theta$ which corresponds to the angular position of the permanent magnet 15 in the rotational angle sensor 1 shown in FIGS. 7a to 7c. In the circuit 180, an NPN transistor 103 turns on during the period of the positive level of an input voltage pulse (IN) and turns off during the period of the ground level of the input signal. The collector voltage of the transistor 103 is applied to two inverting amplifiers IN3 and IN4 which provide an amplified and shaped waveform output, which is applied to the base of an NPN transistor 121. Thus, during the period of the positive level of the input voltage pulse (IN), the transistor 103 turns on, transistor 121 turns off, and PNP transistor 104 turns off. The applied ground level input voltage pulse (IN) turns off the transistor 103 thereby turning on transistor 121 and transistor 104. In other words, the circuit 180 operates in the same manner as the circuit 120 in FIG. 3a to produce a pulse voltage to be applied to the winding 23. As a result, a voltage pulse which begins to rise at a delay time $td_1$ after the falling edge of the input voltage pulse (IN) appears across a resistor 105; the voltage pulse corresponding to the distance $X_1=f(\theta)$ of the permanent magnet 15 away from the magnetically soft member 21. A PNP transistor 181 is coupled to the other winding 34. This transistor 181 turns on as a result of transistor 103 turning on during the period of the positive level of the input voltage pulse (IN) and the resultant turning on of the NPN transistor 182 when the output of the inverting amplifier IN5 is at a positive level. Transistor 181 turns off during the period of the ground level of the input voltage pulse (IN). Consequently, a constant voltage is applied to the second winding 34 during the time period when no voltage is applied to the first winding 23. Reversely, the second winding 34 has no supply of the constant voltage during the time period when a voltage is applied to the first winding 23. As noted above, the supply of the constant voltage alternates between the first and second windings 23 and 34, depending on the state of the applied input voltage pulse (IN). The second winding 34 is coupled to a resistor 183, across which a voltage appears which begins to rise at a delay time $td_2$ after the rising edge of the input voltage pulse (IN) and corresponds to the distance $X_2=f(\theta)$ of the permanent magnet 15 away from the magnetically soft member 35. A voltage $V_{x1}$ appearing across the resistor 105 is applied to one terminal of a capacitor 184, and a voltage $V_{x2}$ appearing across the resistor 183 is applied to the other terminal of the capacitor 184. The distances of the permanent magnet 15 away from the first and second magnetically soft members 21 and 35 are represented by $X_1$ and $X_2$, respectively, in which $X_1+X_2=K$ (constant), with $V_{x1}\alpha X_1$ and $V_{x2}\alpha X_2$. As a result, the potential difference between the two terminals of the capacitor 184 corresponds to $X_1-X_2$. The capacitor 184 and resistor 185 form an integrator circuit, and therefore the voltage stored in the capacitor 184 corresponds to the magnitude of $X_1-X_2$. Hence, since $X_2=K-X_1$ and $X_1-X_2=2X_1+K$, the voltage stored in the capacitor 184 corresponds to the value of $2X_1$. Thus, an analog voltage is obtained which is equal to two times the angular displacement $X_1$ of the permanent magnet relative to the first magnetically soft member 21 which is assumed as a reference point. The opposite terminals of the capacitor 184 are coupled to the respective inputs of an operational amplifier 186 which acts as a differential amplifier. Therefore, an analog output $V\theta$ of the amplifier 186 corresponds to the value $2X_1$.

Figure 4:
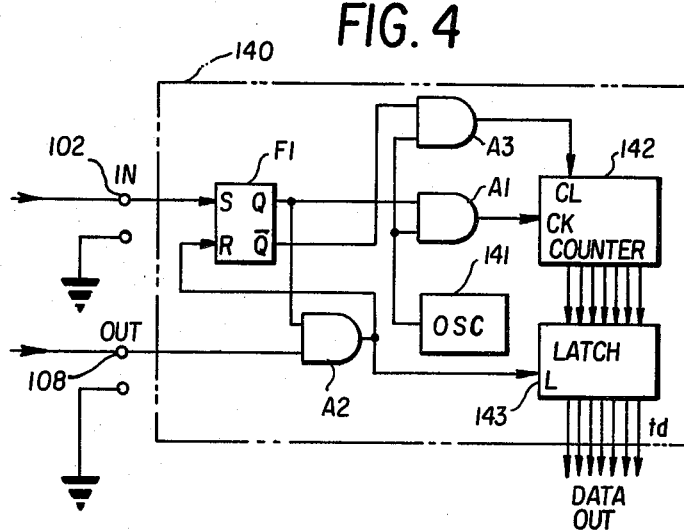
Figure 8B:
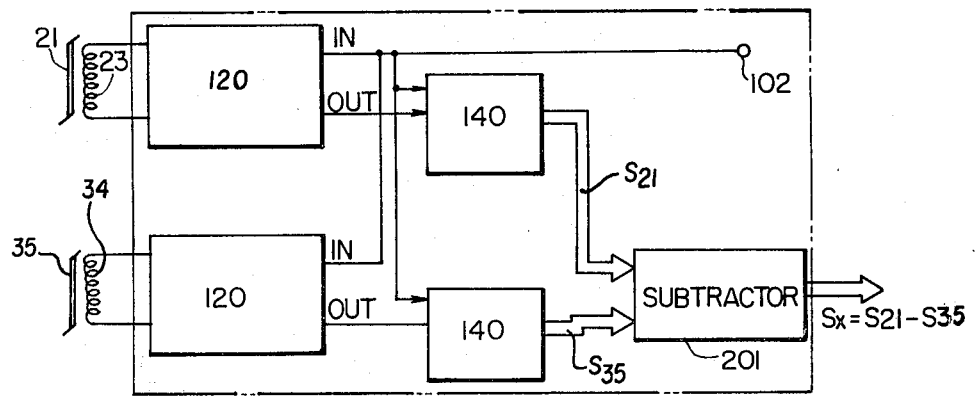
FIG. 8b is a block diagram of an electrical processing circuit connected with the rotational angle sensor shown in FIGS. 7a and 7c, which provides a digital code signal corresponding to the detected angular displacement.

In the electrical processing circuit shown in FIG. 8b, two circuits 120, shown in detail in FIG. 3a, provide the respective pulses which lag by td, and $td_2$, respectively, with respect to the rising edge of the applied input pulse, and which are fed to the respective counter circuits 140, shown in detail in FIG. 4. In response to the input pulses, the counter circuits 140 provide code signals S21 and S35, respectively, which represent the values of $td_1$ and $td_2$, respectively. The code signals are fed into a subtractor circuit 201. The subtractor circuit 201 uses the code signal S21 and S35 to perform a subtract operation on $td_1-td_2$, providing a digital output code $S_x=S_{21}-S_{35}$ which represents $td_1-td_2$ or $2X_1$.

Figure 8C:
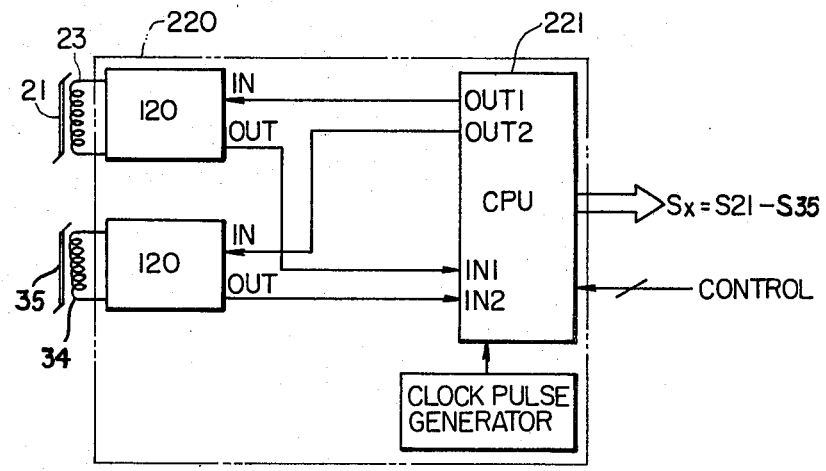
FIG. 8c is a block diagram of an electronic logic processor unit connected to the rotational angle sensor shown in FIGS. 7a and 7c, which provides a digital code signal corresponding to the detected angular displacement.

In accordance with the electronic logic processor unit 220 shown in FIG. 8c, the single chip microcomputer 221 feeds one initial pulse to the circuit 120 coupled with the electrical coil 23, and starts a time count with the rising edge of that pulse, creating $td_1$ count data S21 and storing it. Then, the microcomputer delivers another initial pulse to the electrical coil 34 and starts a time count with the rising edge of that pulse, creating $td_2$ count data S35. Thereafter, the microcomputer performs a subtract operation on $td_1-td_2$ and provides a resultant code signal $S_x=S21-S35$. This operation is continued as long as measurement command signals are issued.

Figure 9A:
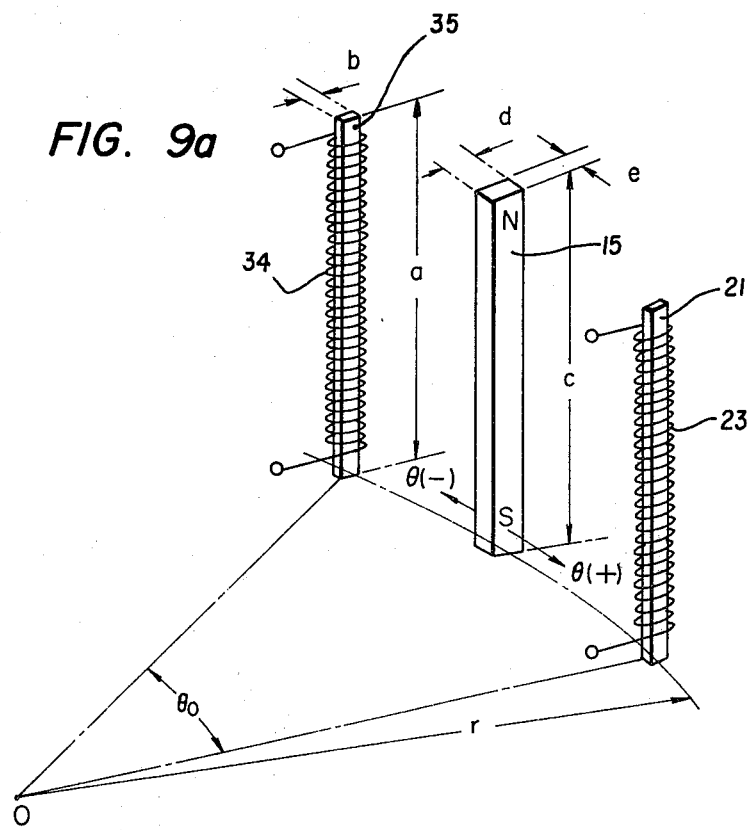
FIG. 9a is a perspective view illustrating the relative positions that the permanent magnet 15 assumes with respect to the magnetically soft members 21, 35 shown in FIGS. 7a through 7c.

The inventor of the present invention has used the following arrangement shown in FIG. 9a and the following assumptions to determine the values of $V\phi$ and td as a function of the rotational angle or angular displacement $\theta$ to be assumed by the permanent magnet 15. The measurements have been taken by arranging magnetically soft members 21 and 35 disposed along a single arc in parallel with each other; and by arranging a permanent magnet 15 placed between and in parallel with the magnetically soft members; and by assuming that the middle positions of the permanent magnet 15 between the magnetically soft members corresponds to a rotation angle of zero (0) about a rotary center point O. Table 2 presents the relationships between the parameters, such as shape, dimensions a through e, r, o, and magnetically soft member material types, and the resulted experimental data.

TABLE 2

Figure 9C:
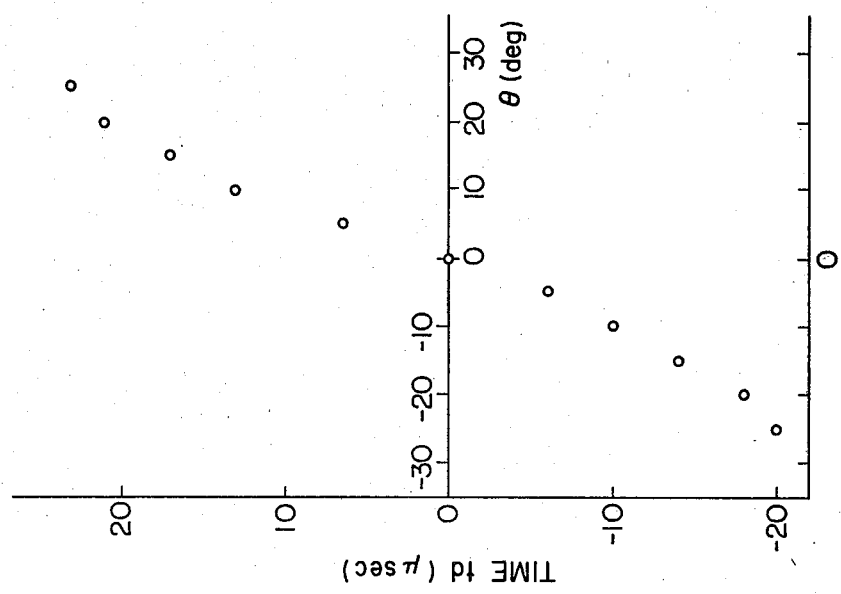
FIG. 9c is a graphical representation of data obtained by measuring a time difference td between waveforms of input and output pulses as a function rotational angle using the arrangement shown in FIG. 9a coupled to the electrical processing circuit shown in FIG. 8b.
Figure 9B:
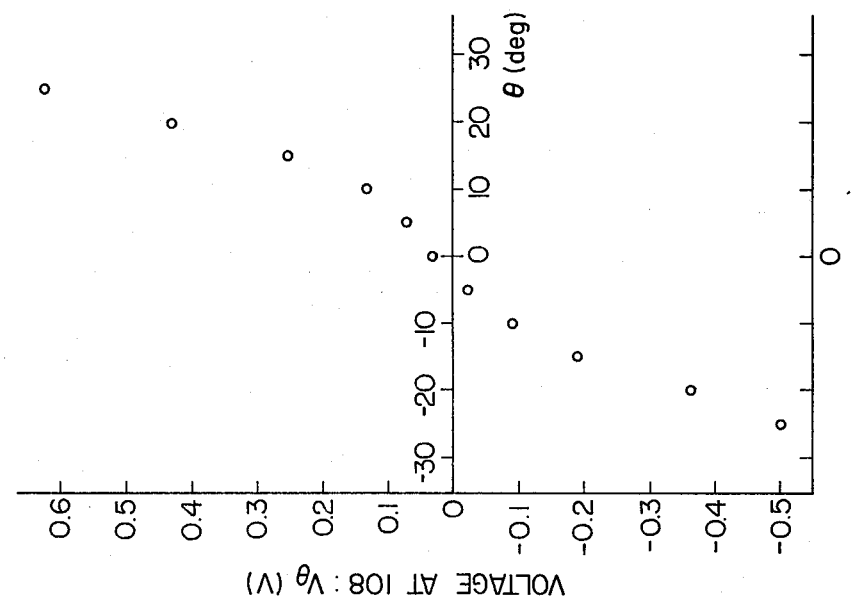

| Case No. | Magnetically Soft Member 21, 35 | | | | | Coil 23,24 Number of turns | Permanent magnet 15 | | | arc | | Measuring means and frequency of input pulse | Voltage Polarity | Data |
|---|---|---|---|---|---|---|---|---|---|---|---|---|---|---|
| | Material,Atomic weight Percent | Thickness | a mm | b mm | Number of Sheets | | c mm | d mm | e mm | $\theta_o$ | r mm | | | |
| 3 | Fe Ni Mo B 40 40 14 6 Amorphous | 0.058 | 30 | 1.8 | 5 | 1000 | 30 | 5 | 5 | 60 | 35 | Circuit 180 5 KHz | N-N | FIG. 9b |
| 4 | Fe Ni Mo B 40 40 14 6 Amorphous | 0.058 | 30 | 1.8 | 5 | 1000 | 30 | 5 | 5 | 60 | 35 | Circuit 180 5 KHz | N-N | FIG. 9c |

As clearly seen from Case No. 3 and Case No. 4 in the above Table 2, and from the related FIGS. 9b and 9c, the voltage Vθ and the delay time td obtained have respective values which are very accurately proportional to the rotation angle θ when the angle θ is in the range of −15° to +15°. The θ−Vφ characteristics and the θ−td characteristics are influenced by the strength of the magnetic field supplied by the permanent magnet 15 to the magnetically soft members 21 and 35. These characteristics may be appropriately changed by varying the values of o or r, or by changing the strength of the magnetic field provided by the permanent magnet 15.

Figure 10A:
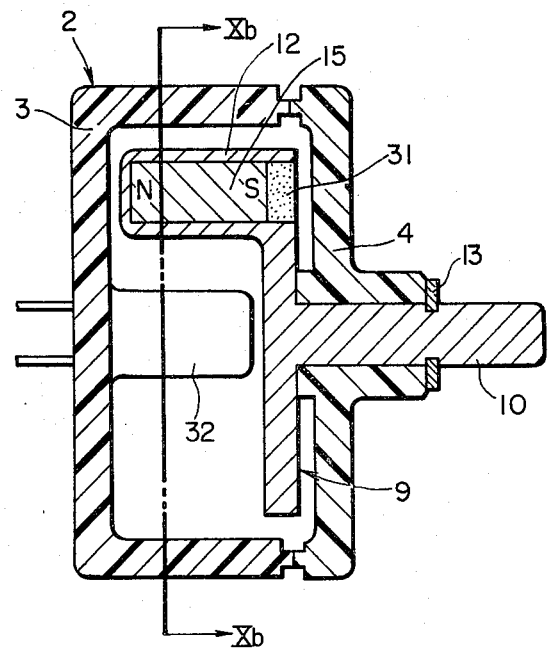
FIG. 10a is a longitudinal sectional view of a rotational angle sensor according to a further preferred embodiment of the present invention.
Figure 10B:
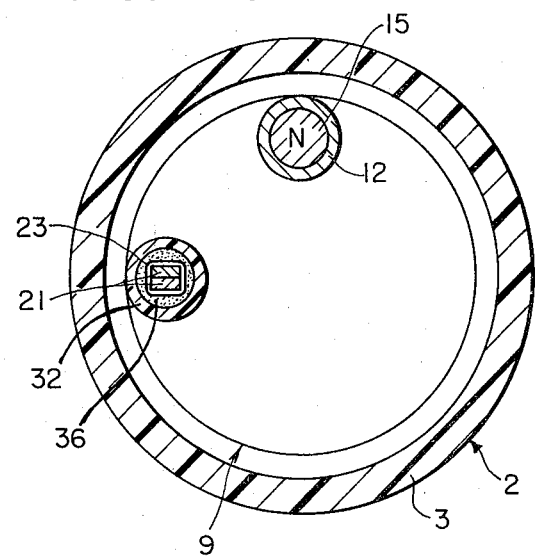

The sensor arrangement shown in FIGS. 10a and 10b is a variation of the sensor 1 shown in FIGS. 7a to 7c, in which one of the magnetically soft members has been omitted and in which a combination of the circuit 100 in FIG. 2a, the circuit 120 in FIG. 3a, and the unit 140 in FIG. 4 is provided.

In the various preferred embodiments and variations thereof which have been described above, each of the magnetically soft members 21 and 35 is formed of several laminated sheets of amorphous magnetic material which provide a high permeability, a high resilience, and a high resistance to deformation. In accordance with the present invention, however, other magnetically soft materials such as Mu-metal (Ni-Fe-Mo alloy), supermalloy (Ni-Fe alloy), and similar alloys may be used in place of the described materials.

As it will be readily understood from the foregoing description of the several preferred embodiments and the references to the experimental data obtained in carrying out those embodiments, the rotational angle sensor according to the present invention has no mechanical sliding contact parts. The rotational angle sensor is responsive to the angular displacement of the movable body such that it can convert the angular displacement to a time difference td between an input pulse applied to the electrical coil and the current pulse to energize the coil, and can electrically process the time difference td to provide an angular displacement detecting signal in the form of an analog voltage or time count code. Thus, the sensor construction is particularly advantageous due to its high mechanical vibration and wear resistance. The fact that no mechanical linkage is required to connect between the movable body and its associated transducer, provides a stable rotational angle detection which is not adversely affected by any mechanical rattling that might otherwise occur. The advantages that should be particularly noted are the simple arrangement of the electrical processing circuits to be coupled with the rotational angle sensor, and more particularly the use of the large scale integration (LSI) semiconductor device, such as the single chip microcomputer, which provides a rotational angle detect pulse, and which provides a simple means for converting a time difference between that pulse and the coil energizing current detected pulse to a suitable digital code form.

Although the present invention has been described with reference to the several preferred embodiments thereof, obviously, numerous (additional) modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A rotational angle sensor device, comprising:
   a casing;
   a movable body rotatably supported by said casing, the position of said movable body being responsive to an angular displacement caused by an external object;
   permanent magnet means rigidly secured to said movable body in said casing for providing a magnetic field;
   core means disposed adjacent to a range of movement of said permanent magnet means, said core means including magnetically soft material;
   electrical coil means including at least one coil wound about said core means;
   means for detecting the rotational position of said movable body, comprising,
   means for applying a pulse voltage to a first terminal of said coil to saturate magnetically said core means, and
   means coupled to a second terminal of said coil for producing a rotational angle output signal indicative of the rotational position of said magnet means and therefore of said movable body based on the time between application of said pulse voltage and saturation of said core means.

2. A rotational angle sensor device as recited in claim 1, wherein:
   said permanent magnet means includes a first axis passing through its poles, said first axis lying in a first plane located pependicular to a rotary axis of said movable body; and
   said core means and said electrical coil means wound thereon include a longitudinal axis, said longitudinal axis lying in a second plane located perpendicular to said rotary axis of said movable body.

3. A rotational angle sensor device as recited in claim 2, wherein:
   said first axis of said permanent magnet means and said longitudinal axis of said core means and said electrical coil means intersect said rotary axis of said movable body.

4. A rotational angle sensor device as recited in claim 1, wherein:
   said permanent magnet means includes a first axis passing through its poles, said first axis being parallel with a rotary axis of said movable body and spaced apart therefrom; and
   said core means and said electrical coil means wound thereon include a longitudinal axis, said longitudinal axis being parallel with said rotary axis of said movable body and spaced apart therefrom.

5. A rotational angle sensor device as recited in claim 4, wherein:
   said first axis of said permanent magnet means and said longitudinal axis of said core means and said electrical coil means are each spaced an equal distance from said rotary axis of said movable body.

6. A rotational angle sensor device as recited in claim 1, wherein:
   said permanent magnet means includes a first axis passing through its poles, said first axis being parallel with a rotary axis of said movable body;
   said core means includes a pair of core members disposed in an opposed relationship to each other, said pair of core members being spaced apart from and on opposite sides of said permanent magnet means, said pair of core members including magnetically soft material; and
   said electrical coil means includes a pair of electrical coils, each of said pair of electrical coils being wound respectively on one of said pair of core members.

7. A rotational angle sensor device as recited in claim 6, wherein:
   said first axis of said permanent magnet means and said pair of core members are each spaced an equal distance from said rotary axis of said movable body.

8. A rotational angle sensor device as recited in claim 1, wherein:
   said magnetically soft material is an amorphous magnetic material.

9. A rotational angle sensor device as recited in claim 1, wherein said movable body comprises:
   an input shaft member coupled to said body, said shaft member coupling said body to said external object; and
   a permanent magnet housing, said housing being formed integrally to said body.

10. A rotational angle sensor device according to claim 1, wherein said detecting means comprises:
    constant current means for producing a constant current through said coil upon application of said pulse voltage to said first terminal of said coil.

11. A rotational angle sensor according to claim 10, wherein said constant current means comprises:
    at least one field effect transistor connected to said second terminal of said coil.

* * * * *

UNITED STATES PATENT AND TRADEMARK OFFICE
CERTIFICATE OF CORRECTION

PATENT NO. : 4,380,928
DATED : April 26, 1983
INVENTOR(S) : Shinichiro Iwasaki

It is certified that error appears in the above-identified patent and that said Letters Patent is hereby corrected as shown below:

In column 1, line 15, delete "capabe" and insert therefor --capable--;

In column 3, line 33, delete "dislacement" and insert therefor --displacement--;

In column 6, line 47, delete "leve" and insert therefor --level--;

In column 7, line 51, delete "experiental" and insert therefor --experimental--;

In column 7, line 66, delete "functin" and insert therefor --function--;

In TABLE 1, under Material, atomic weight Percent, delete "$Fe_{40}$ $Ni_{140}$ $Mo_{14}$ $B_6$ and insert therefor --$Fe_{40}$ $Ni_{40}$ $Mo_{14}$ $B_6$--;

UNITED STATES PATENT AND TRADEMARK OFFICE
CERTIFICATE OF CORRECTION

PATENT NO. : 4,380,928

DATED : April 26, 1983

INVENTOR(S) : Shinichiro Iwasaki

It is certified that error appears in the above-identified patent and that said Letters Patent is hereby corrected as shown below:

In column 8, line 30, delete "thr" and insert therefor --the--;

IN column 10, line 32, delete "respectiverly" and insert therefor --respectively--;

In TABLE 2, under Coil, delete "23,24" and insert therefor --23,34--;

In TABLE 2, under Material, Atomic weight Percent, delete "$Fe_{40} Ni_{40} Mo_{14} B_6$ and insert therefor --$Fe_{40} Ni_{40} Mo_{14} B_6$--

Signed and Sealed this

Thirtieth Day of August 1983

[SEAL]

Attest:

GERALD J. MOSSINGHOFF

Attesting Officer

Commissioner of Patents and Trademarks